(12) United States Patent  (10) Patent No.:  US 7,978,619 B2
Nielsen  (45) Date of Patent:  Jul. 12, 2011

(54) APPLICATION SPECIFIC, NETWORK PERFORMANCE MEASUREMENT SYSTEM AND METHOD FOR APPLICATIONS

(75) Inventor: Randy Nielsen, Scotts Valley, CA (US)

(73) Assignee: Vocera Communications, Inc., Cupertino, CA (US)

( * ) Notice: Subject to any disclaimer, the term of this patent is extended or adjusted under 35 U.S.C. 154(b) by 975 days.

(21) Appl. No.: 11/600,533

(22) Filed: Nov. 16, 2006

(65) Prior Publication Data

US 2008/0117831 A1  May 22, 2008

(51) Int. Cl.
*H04L 12/26*  (2006.01)
*H04W 24/00*  (2009.01)
(52) U.S. Cl. .................................. 370/252; 455/424
(58) Field of Classification Search .............. 455/424, 455/425, 423, 411, 410, 404.1, 404.2, 456.1, 455/457, 67.11, 67.13, 41.2; 370/252, 241.1, 370/242–245, 338; 379/210, 67, 211, 212, 379/213, 214, 88, 89, 38, 95, 93; 340/573.1, 340/572.1, 568.1, 669
See application file for complete search history.

(56) References Cited

U.S. PATENT DOCUMENTS

| 5,425,076 | A | 6/1995 | Knippelmier ................... 379/27 |
| 6,631,258 | B1 | 10/2003 | Chow et al. |
| 6,775,544 | B2 | 8/2004 | Ficarra .......................... 455/424 |
| 6,785,540 | B1* | 8/2004 | Wichelman ................... 455/423 |
| 6,925,601 | B2* | 8/2005 | Moore et al. .................. 715/707 |
| 7,158,616 | B2* | 1/2007 | Yang et al. ................. 379/29.01 |
| 7,450,024 | B2* | 11/2008 | Wildman et al. ............ 340/669 |
| 7,522,908 | B2* | 4/2009 | Hrastar ......................... 455/411 |
| 2001/0036825 | A1* | 11/2001 | Martin .......................... 455/424 |
| 2003/0087635 | A1 | 5/2003 | Sheffield ...................... 455/423 |
| 2003/0161341 | A1 | 8/2003 | Wu et al. ...................... 370/448 |
| 2004/0038687 | A1 | 2/2004 | Nelson ....................... 455/456.1 |
| 2005/0138155 | A1 | 6/2005 | Lewis .......................... 709/223 |
| 2005/0195744 | A1 | 9/2005 | Ryan et al. ................... 370/235 |
| 2005/0250510 | A1* | 11/2005 | Kaikkonen et al. ........ 455/452.2 |
| 2006/0290519 | A1* | 12/2006 | Boate et al. ................ 340/573.4 |
| 2007/0195696 | A1* | 8/2007 | Dobson et al. ............... 370/232 |
| 2007/0299473 | A1* | 12/2007 | Matos ............................... 607/5 |

OTHER PUBLICATIONS

PCT/US 07/23819, International Search Report, Apr. 18, 2008.
PCT/US 07/23819, Written Opinion, Apr. 18, 2008.

* cited by examiner

*Primary Examiner* — Melody Mehrpour
(74) *Attorney, Agent, or Firm* — DLA Piper LLP (US)

(57) ABSTRACT

An application specific, network performance measurement system and method are provided wherein the application operates over a network wherein the performance of the network at one or more elements of the network is measured.

37 Claims, 9 Drawing Sheets

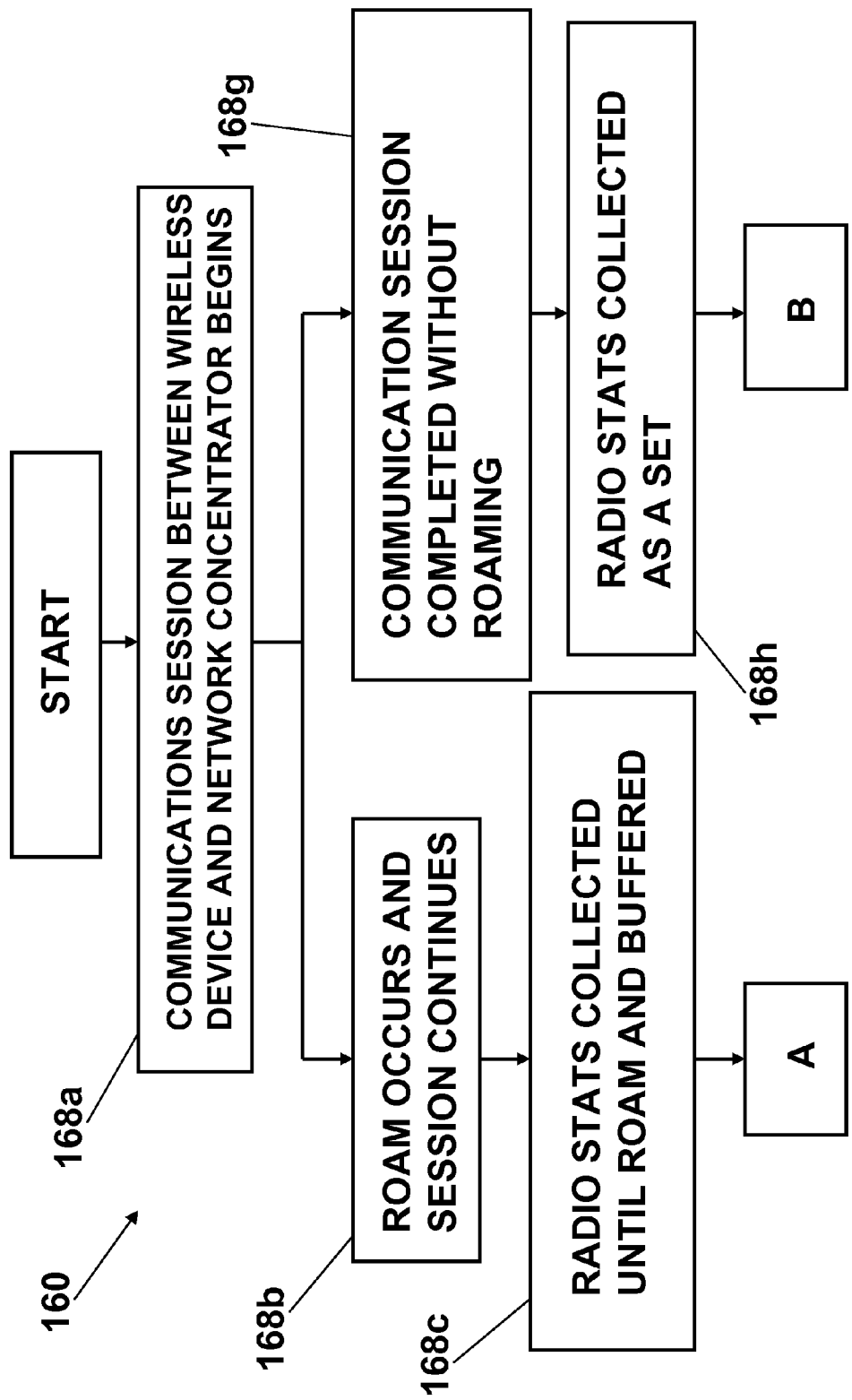
FIGURE 4B1

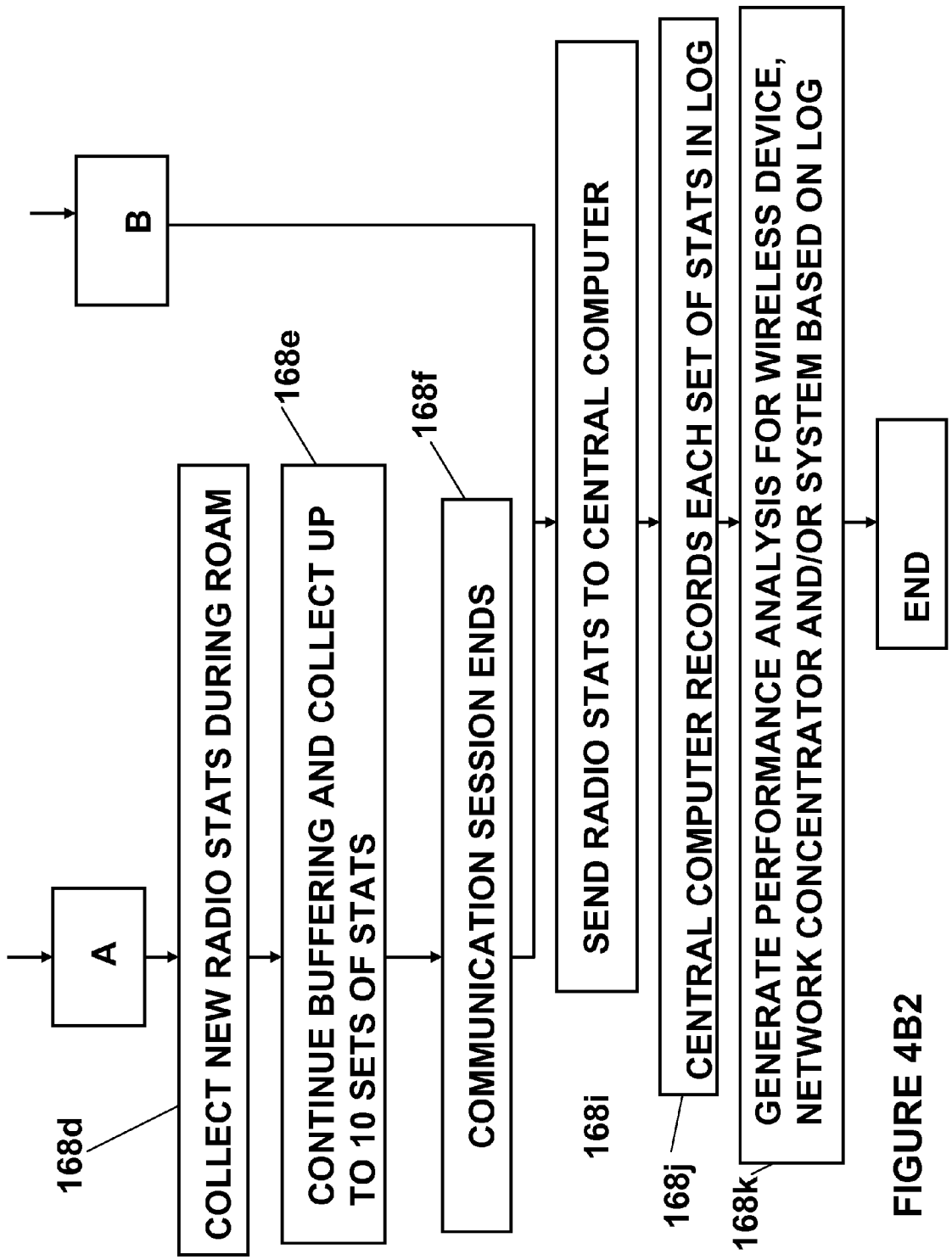
FIGURE 4B2

| SERIAL NUMBER | AUDIO DATA |
|---|---|

FIGURE 5

| Number of Expected Frames 172 | Number of Received Frames 174 | Access Point Identifier 176 | Start Time for Segment of Communications Session 178 |
|---|---|---|---|

170

FIGURE 6

APPLICATION SPECIFIC, NETWORK PERFORMANCE MEASUREMENT SYSTEM AND METHOD FOR APPLICATIONS

FIELD OF THE INVENTION

The invention relates generally to a system and method for measuring the performance of a network that supports applications, and in particular to a system and method for measuring the performance of a network that supports voice over wireless IP.

BACKGROUND OF THE INVENTION

For a real-time application that runs on a wireless network or communications system, it is desirable to be able to assess the real-time performance of the network, the network clients running the application, and the access points. In cellular type networks (mobile phones, wireless email devices and the like), a system exists that attempts to test a cellular communications network using a mobile test set to assess the quality of the wireless signal in a particular cell of the cellular communications network. These systems are able to determine the quality of the signal from the base station of the cell, but cannot and do not attempt to assess the quality of the signal at each mobile handset within the cell at any time. Since the cellular communications network has a cell site with a known location and known equipment installed by the network provider, the network provider is less concerned with the actual reception at each mobile handset. However, this testing system would not work very well for a wireless network system, such as an IEEE 802.11 (b) or (g) system (collectively "802.11 system"), since the access points in the 802.11 system are not uniform and the location of each access point is not predetermined by the access point provider to ensure optimal operating conditions. Other known systems measure the signal interference at a base station or collect call data from a set of mobile phones in order to assess the coverage area of a cell site. These typical systems provide point-to-point quality measurements.

Other systems and devices exist that permit a system to adjust the data rate of the wireless transmission based on the quality of the link. These systems have existed in modem technology for quite some time since modems adjust their transmit and receive speeds (baud rate) based on the quality of the communications link between the two modems that are communicating with each other. As above, this system does not attempt to assess the quality of the wireless signal at each receive station that is part of the communications network nor upload the quality information at each receive station to a central computer in order to perform overall network performance monitoring.

Another device measures the throughput of data at a base station of a wireless local area network wherein messages are sent during a test period to assess the throughput for the particular base station which is similar to a typical access point. This device measures the point-to-point quality measurement of the wireless local area network. However, this device does not accumulate the information about the station and then forward that information onto a central computer in order to provide overall network performance monitoring of the overall network, each access point and each station of the system.

For a wireless 802.11 network, a network sniffer may be used to measure the quality of the wireless signal at each access point to assess the performance of that access point. However, the network sniffer is not mobile and therefore does not accurately measure the performance of the wireless devices that are part of an 802.11 network. In addition, it is impractical to use a network sniffers for a large wireless network.

It is desirable to be able to assess the application specific, network performance of a network system wherein the performance is measured at one or more elements of the network.

SUMMARY OF THE INVENTION

An application specific, network performance measurement system and method are provided wherein the application operates over a network wherein the performance of the network at one or more elements of the network is measured. The one or more elements of the network may include a wireless device that communicates with the network, a network concentrator and the overall network. The wireless device and network concentrator operate wirelessly and the wireless performance of each of these elements is measured. The overall network includes wireless and wired components so that the performance measurement of the overall network includes the performance of both the wireless and wired components. In an example of an implementation of a network system, the network system includes a central unit (a Vocera server in an example of a specific implementation of the network), one or more network concentrators (802.11 access points in an example of a specific implementation of the network) coupled to the central unit over a wired link and one or more wireless devices (badges in the specific implementation of the network) that communicate wirelessly with the one or more network concentrators are the parts of the network over which a real-time application (such as a voice controlled communications system in one specific embodiment) is provided. To assess the application specific network performance of the network, the system may gather information that characterizes the wireless performance of each wireless device. The central unit is a device/computing unit that collects and stores the performance information. The characteristic information gathered for each wireless device, also known as radio statistics, may include one or more of a packet error rate for the wireless device, a received signal strength at the wireless device, jitter/latency at the wireless device and/or the data rate at the wireless device receives/transmits the data packets. In the system and method, the radio statistics for each wireless device are gathered during the normal operation of the system. The system permits the network administrator to assess the performance of the network that supports a real-time application (a voice controlled communications application in one exemplary embodiment) at a customer's site conveniently and during the normal operation of the system.

A system for measuring the application specific, network performance at one or more elements in the network is provided in which the network has a central computing device unit, one or more network concentrators coupled to the central computing device unit over a link wherein each network concentrator communicates with the central computing device unit. Each network concentrator has a coverage range and a plurality of wireless devices that wirelessly communicate with a network concentrator when the wireless device is in the coverage range of the network concentrator. The application specific network performance measuring system comprises a unit, within each wireless device, that gathers a received data characteristic for each segment of a communications session between the wireless device and a particular network concentrator to generate a set of received data characteristics for each communications session. The application specific network performance monitoring system also has a unit that communicates the set of received data characteristic for each communications session to a central computing device unit. The central computing device unit has a performance unit that generates an application specific network performance indication of the network at one or more elements of the network based on the set of received data characteristic for each communications session for each wireless device.

A method for measuring the application specific network performance of a network at one or more elements in the network is also provided. The network has a central computing device unit, one or more network concentrators coupled to the central computing device unit over a link and a plurality of wireless devices that wirelessly communicate with a network concentrator. In the method, a received data characteristic for each segment of each communications session between the wireless device and a particular network concentrator is gathered at each wireless device during the segment of the particular communication session to generate a set of received data characteristics for each communications session. Each wireless device then communicates the set of received data characteristic for each communications session to the central computing device unit. The central computing device unit then generates an application specific, network performance indication of the network based on the set of received data characteristic for each communications session.

BRIEF DESCRIPTION OF THE DRAWINGS

FIGS. 4B1 and 4B2 illustrate more details of the method for measuring application specific, network performance of a network;

FIG. 5 illustrates an example of an audio frame data structure;

FIG. 6 illustrates an example of a set of data captured by each wireless device that may be used by the application specific network performance measuring system;

DETAILED DESCRIPTION OF AN EMBODIMENT

The invention is particularly applicable to measuring the application specific network performance for a voice controlled communication application implemented over the network described below and it is in this context that the invention will be described. It will be appreciated, however, that the system and method in accordance with the invention has greater utility since: 1) the system and method may be used to assess the application specific, network performance of the network for other applications that may or may not be real-time applications; 2) the system and method may be implemented in ways different from the exemplary embodiment and those other implementations are within the scope of the invention; 3) the system and method can be used with a variety of networks including wireless networks, wired networks and networks with both wired and wireless components; and 4) the system and method are not limited to the exemplary embodiment nor the exemplary network (an 802.11 network).

Figure 1:
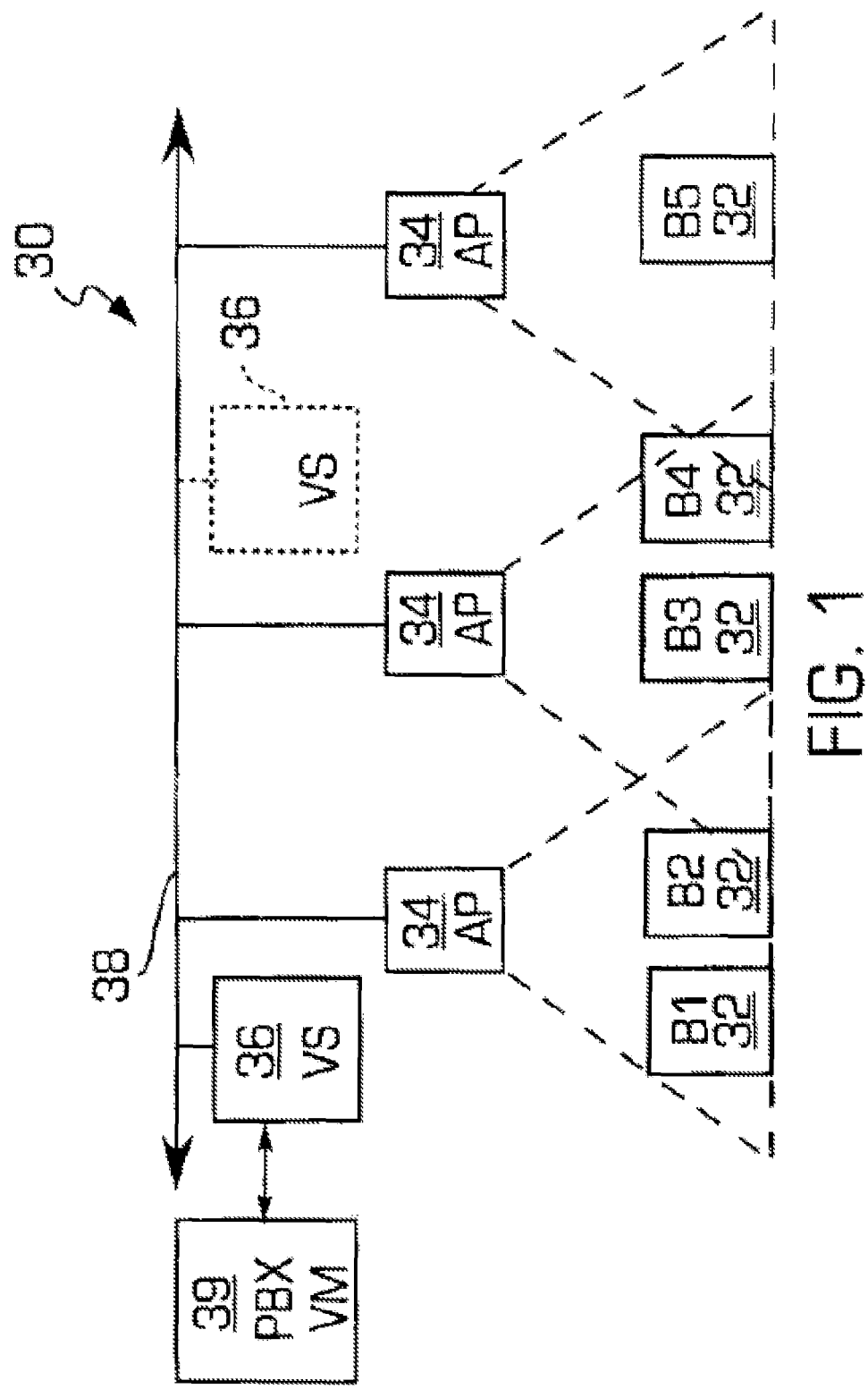
FIG. 1 illustrates an example of a network that may incorporate an application specific, network performance measuring system.

FIG. 1 illustrates an example of a network 30 that may support a real-time application and may incorporate an application specific, network performance measurement system. In general, the network may include one or more wireless devices/mobile devices, one or more network concentrators and a central computing device wherein the mobile devices communicate wirelessly with the network concentrators and the network concentrators are coupled to the central computing device over a link. In the particular example shown in FIG. 1, the system comprises a plurality of wireless communication devices (mobile devices) referred to as Badges 32 (marked B1-B5 in this example), one or more network concentrators (which may be 802.11 wireless access points 34 (marked AP) in the exemplary system) and one or more central computing devices referred to as controlling computers 36 (marked VS), as shown. The access points 34 in FIG. 1 may be standard commercially available wireless access points, such as a standard 802.11(b) or 802.11(g) access point in an exemplary embodiment, which collectively implement a network allowing the Badges 32 to communicate with other components of the communications system 30. The access points 34 communicate with each other, and with the controlling computer 36, over a link 38 which may be a local area Ethernet network in the exemplary embodiment. Taken together, the access points 34 and the link 38 provide the network infrastructure for the wireless communications system 30. Any of the controlling computers 36 may also be interfaced to a telephone system such as a Private Branch Exchange (PBX) system 39, which allows the wireless communications system 30 to communicate with common telephone communication systems. Each Badge 32 is a wireless communications device that is capable of communicating with an access point 34, and therefore is also capable of communicating with the controlling computer 36 in order to implement the desired wireless communication functions. Each Badge 32 serves as one of the primary communications endpoints of the system.

The system 30 shown in FIG. 1 may be implemented using wireless access points specifically installed for the system 30, but may also be implemented on an existing wireless network in which the wireless access points are shared by other applications. In either case, the wireless network system 30 is a system in which data is communicated between the badges 32, the access points and the central computer 36. The data may include the communication session data, the characteristic information (known as the radio statistics—radio stats) and the voice data of the wireless system. In the wireless network system, badge to badge communications and badge to server communications occur wherein both include badge to access point communications sessions. Thus, even when the access points are shared with other wireless devices and systems, only the badges 32 are able to communicate with the central computer 36 using the particular protocol of the system.

Figure 2A:
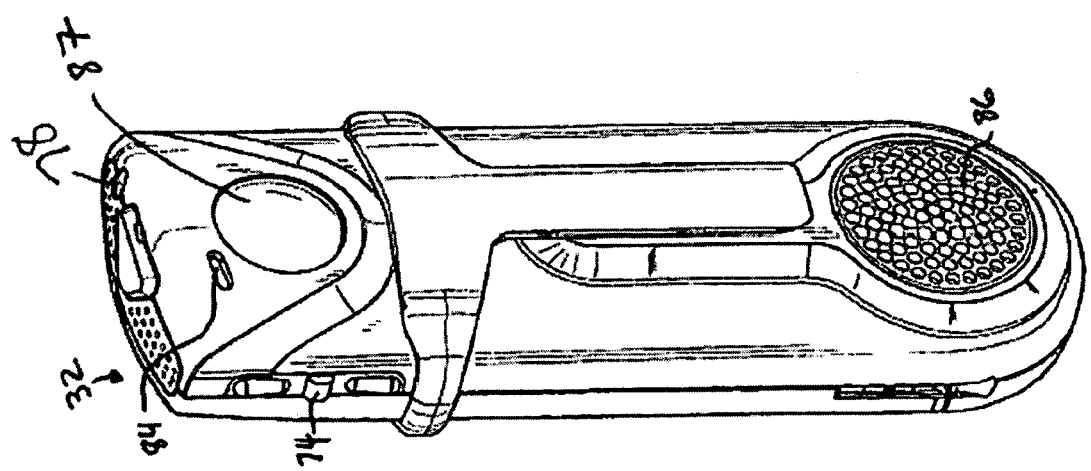
FIGS. 2A and 2B illustrate an example of a wireless device that may be part of the network shown in FIG. 1.
Figure 2B:
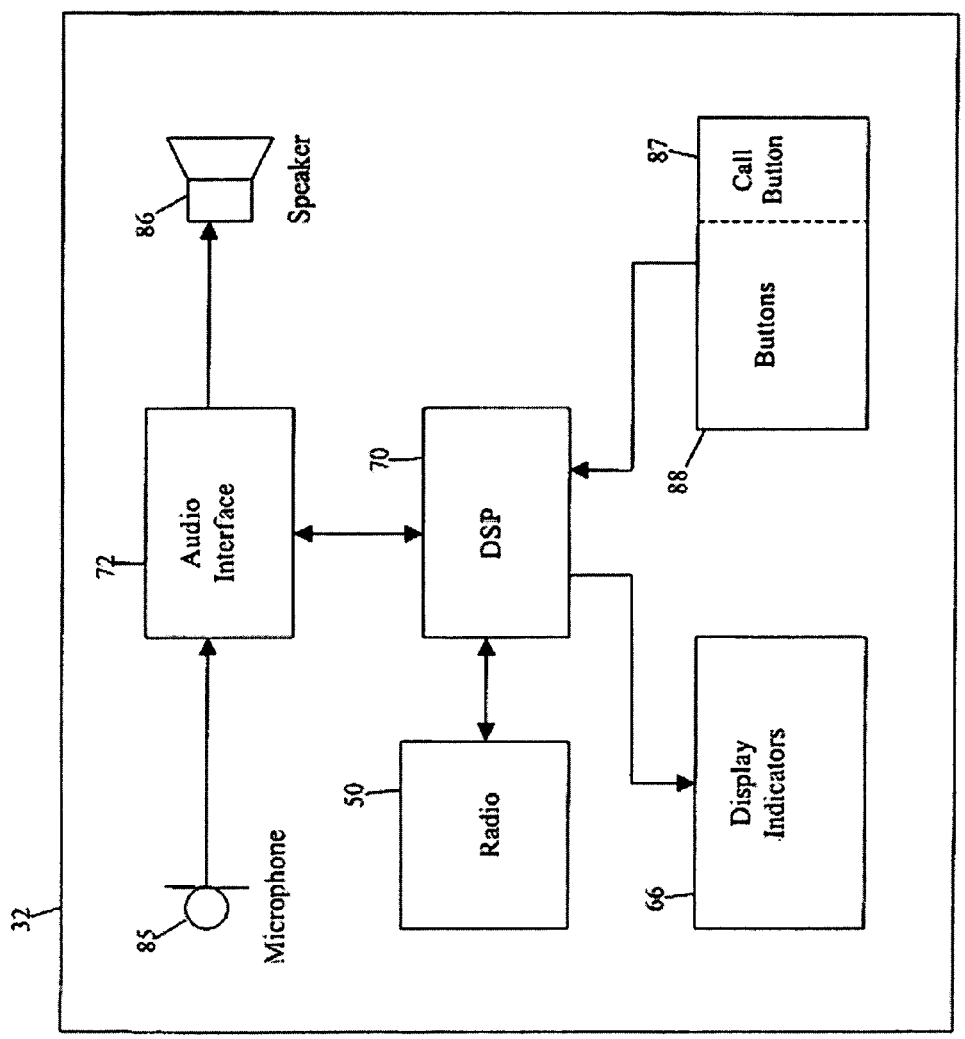

FIGS. 2A and 2B illustrate an example of a mobile device that may be part of the network shown in FIG. 1. In particular, FIG. 2A illustrates more details of the communications badge 32 shown in FIG. 1 and FIG. 2B is a block diagram illustrating the hardware components of the badge 32. In a preferred embodiment, each Badge 32 is a portable, battery-powered, wireless device that supports hands-free, full duplex voice communications using a small microphone 85 (mounted behind microphone port 84) and a speaker 86. The Badges are sufficiently small and lightweight enough that they may be clipped onto a shirt pocket of the user or may be worn on a lanyard around the neck of a user. Each Badge 32 has a processing unit 70, such as a digital signal processor (DSP) shown in FIG. 2B, that serves as a programmable controller of all other Badge hardware. The processing unit 70 may include a processor and memory that stores the software resident on each Badge. The processing unit 70 is interfaced to a radio 50 for communication with the communication system's access points. The processing unit is interfaced to the microphone 85 and the speaker 86 through an audio interface 72. The processing unit is also interfaced to various display indicators 66 and to various buttons 88 including a "Call Button" 87, which is generally used to initiate communications sessions. Further details about the Badge 32 are provided in pending U.S. patent application Ser. No. 09/947,235, which is incorporated herein by reference. The badge may gather a set of data during each audio communications session (an example of which is shown in FIG. 6) using a gathering unit (preferably implemented as a piece of software code or as microcode embedded into the processing unit) and communicate that set of data to the central computer 36 so that the set of data may be used by the application specific network measuring system and method to assess the performance of the network (at different levels of granularity) as described in more detail below.

Figure 3A:
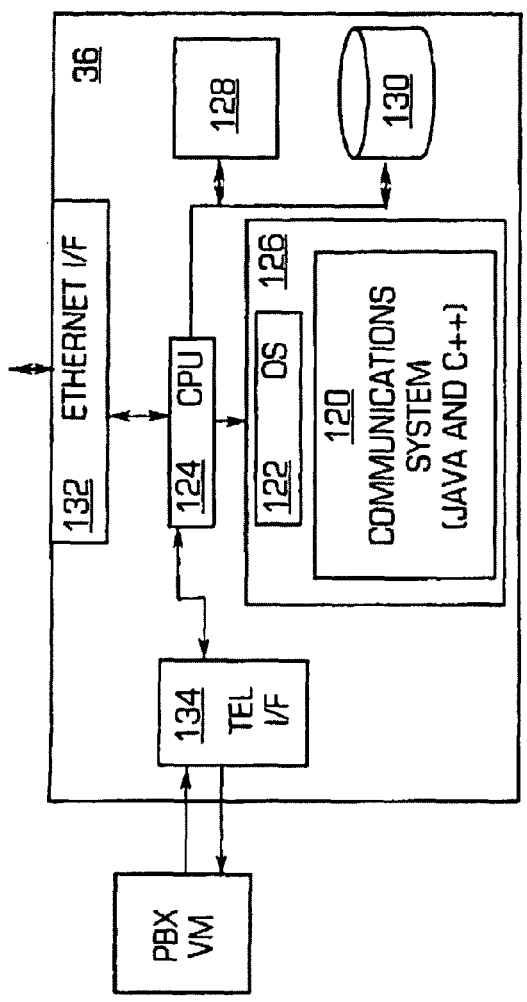
FIGS. 3A and 3B illustrate more details of a central computing device that is part of the network shown in FIG. 1.
Figure 3B:
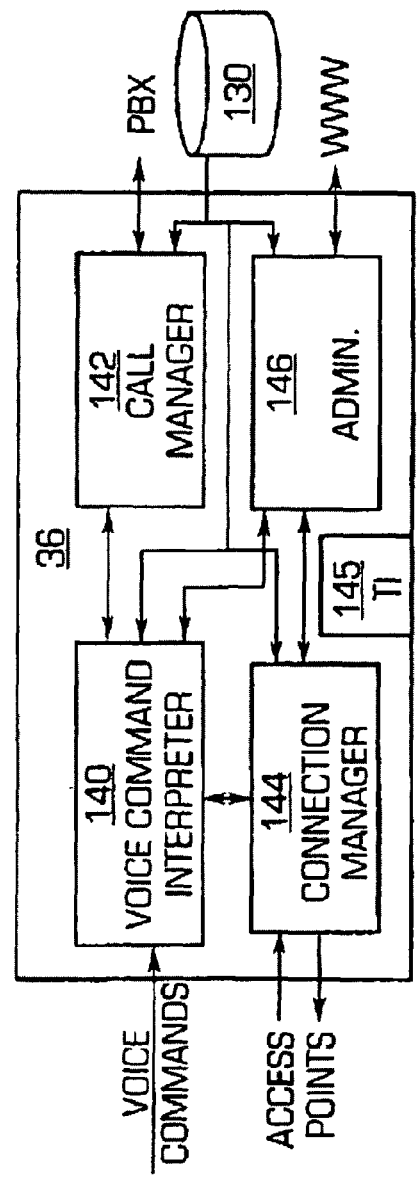

FIGS. 3A and 3B illustrate more details of a central computing device 36 that is part of the network shown in FIG. 1. FIG. 3A is a block diagram of an exemplary controlling computer 36 in accordance with the invention. The controlling computer 36 is responsible for the overall control of the system. In a preferred embodiment, the controlling computer 36 may be a typical off-the-shelf computer system, such as a typical server computer, the hardware details of which are well known. In more detail, the central computer 36 may include a central processing unit (CPU) 124 and a persistent storage device 128, such as a hard disk drive, an optical drive, a flash memory or the like. The controlling computer may also have telephony interface hardware 134 that permits the controlling computer to interface to a telephone and/or Public Branch Exchange (PBX) system 39, and a computer network interface 132, such as the Ethernet interface shown, that permits the controlling computer to connect to the computer network. In addition, the controlling computer 36 must have a memory 126 that stores software currently being executed by the CPU 124. This software includes at a minimum an operating system 122, application software 120 to implement the wireless communication functions of the wireless communications system, and a database 130 to store information associated with the wireless communications system. This database information includes but is not limited to wireless device log files from the wireless devices and performance analysis information.

The database 130 stores user information, including the assignment of users to devices, speech files containing user name prompts and voice signatures, user preferences and so forth. It also keeps track of the whereabouts of users as they roam within the communications network. In large corporate installations, this component may interface to global employee databases maintained by the customer. Some information fields in database 130, for each user of the system, may include but are not limited to the following: user name, login name, password, alternative name/identifier, phone number and address, voicemail greeting message, ring tone, caller identifier status (on/off), buddy list, block list of calls to block, message forwarding service status (on/off and if on, to what number), distribution groups (e.g. "Memory Marketing Team"), saved messages, and device serial number.

FIG. 3B illustrates more details of the application software 120. In a preferred embodiment of the invention, the application software comprising one or more portions of code wherein each portion of the code has a plurality of lines of computer instructions that implement the operations and functions described below. The software may include a voice command interpreter 140, a call manager 142, a connection manager 144, and an administrator 146 that are interconnected together and exchange commands and data with each other as shown. The voice command interpreter 140 has responsibility for interpreting and executing voice-based commands received from the Badges. The call manager 142 has responsibility for the set-up and the breakdown of two-party and multi-party calls (including external calls) and maintaining status information associated with these calls. The connection manager 144 is the component that is responsible for managing access points and the connections among Badges and access points. It also supports a hand-off from one access point to another as a Badge roams about the network. The administrator module 146 supports administrator-level and user-level configuration and monitoring of the system through a web browser interface as shown. A method for application specific, network performance measurement now is described in more detail.

Figure 4A:
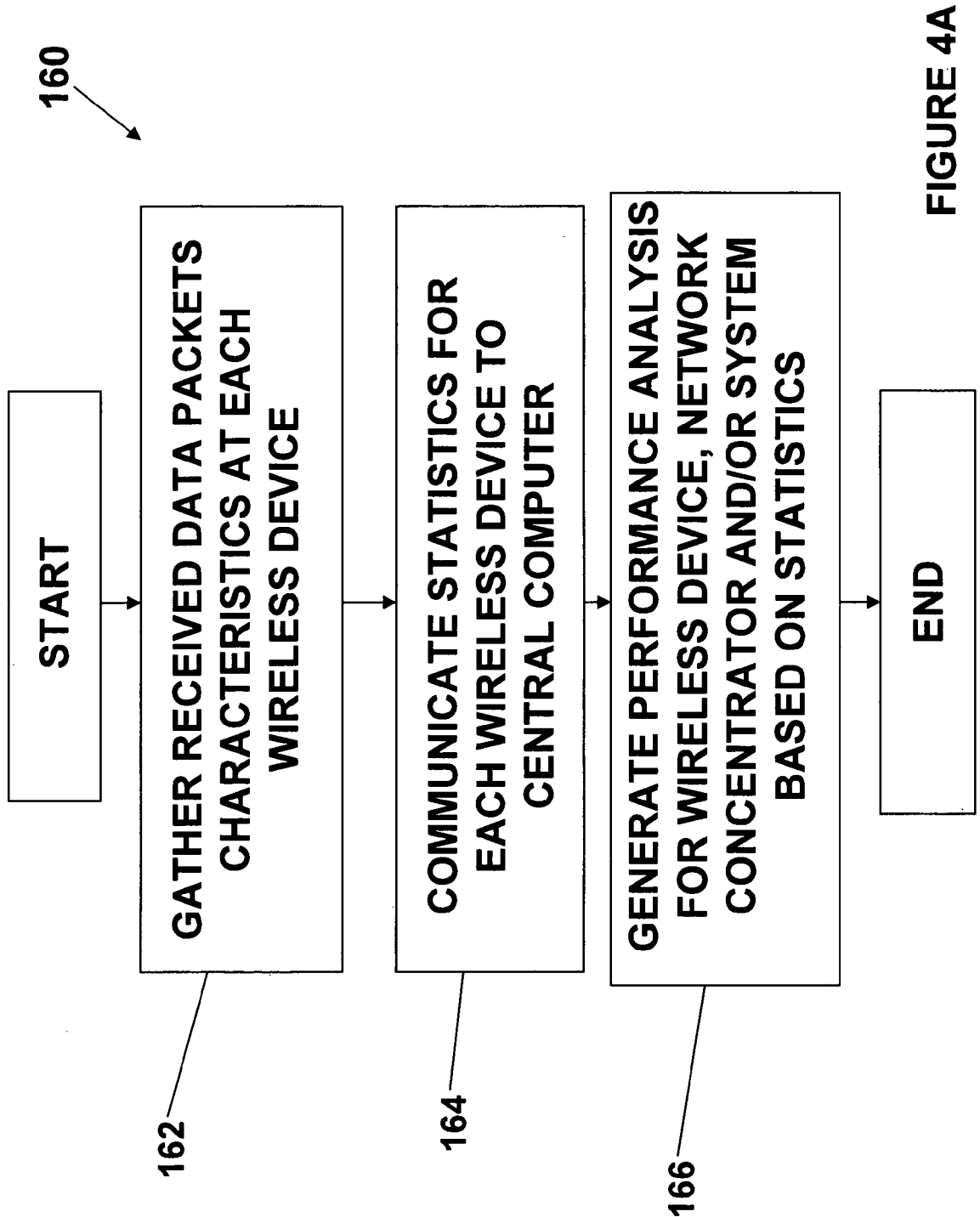
FIG. 4A illustrates a method for measuring application specific, network performance of a network.

FIG. 4A illustrates a method 160 for measuring the application specific, network performance of the network that support a real-time application. The method is preferably implemented as a piece of software code on each badge of the system shown in FIG. 1 along with a piece of software code on the central computing device. To measure the application specific, network performance of the network that supports an application, the radio stats for a plurality of communication sessions between one or more wireless devices and one or more network concentrators are collected. Each communication session may include one or more segments wherein each segment is data transferred between a particular wireless device and a particular network concentrator. Thus, for example, when a wireless device starts and completes a communication session wirelessly communicating with a single network concentrator, the communication session has one segment. However, if the wireless device roams between two or more different network concentrators during a communication session, the communication session will include two or more segments as is described in more detail with reference to FIG. 4B. The method is based on measuring a received data packet characteristic at each wireless device of the network and using that information to assess the performance of the network at one or more elements of the network. In one exemplary embodiment, the network is a wireless network, preferably one of the 802.11 (b) or (g) network variants, in which the only communications that occur within the system are between wireless devices specifically designed for the system (for example from a single vendor) and/or between a wireless device and the central unit. An example of the exemplary wireless network that may use this method is shown in FIG. 1.

Returning to FIG. 4A, in step 162, each wireless device (the badges in the system shown in FIG. 1) gathers received data packet characteristic information during each communications session of the wireless device. In the system shown in FIG. 1, a data packet frame occurs every 36 milliseconds during a communications session so that a 10 second communication session generates 300 frames of data wherein each frame has a serial number associated with the frame as shown in FIG. 5. The received data packet characteristic may be one or more of a packet error rate for the wireless device, a received signal strength at the wireless device, jitter/latency at the wireless device and/or the data rate at the wireless device receives/transmits the data packets. When the packet error rate of the wireless device is the characteristic used for the method, the packet error rate during the communications session is determined based on the sequential serial numbers in the data frames during the communications session to determine which data frames are missing (since the serial number for that data frame is missing.) The received data packet characteristic for each communications session may be combined with other information into a communications session record file. An example of a communications session record file when the packet error rate of the wireless device is used as the received data packet characteristic is now described.

FIG. 6 illustrates a record 170 for each segment of a communications session. For each wireless device, a record 170 is created for each segment of each communications session. The record 170 may include a field 172 containing a number of expected data frames during the segment of the communications session determined by examining the serial numbers of the received frames (if the serial numbers of the data packets during a particular segment of a communications session start at 1 and stop at 10, then 10 data frames are expected during the particular segment of the communications session), a field 174 containing a number of received data frames based on the actual data frames received, a field 176 with a network concentrator identifier (an access point identifier in the exemplary embodiment) that identifies the network concentrator through which the segment of the communications session occurred and a field 178 that contains a start time of the segment of the communications session.

Returning to FIG. 4A, in step 164, each wireless device communicates its log files for its communications sessions (with one or more access points) to the central unit 36 shown in FIG. 1. In accordance with the invention, the log files of the wireless devices may also be processed at a site remote from the wireless network or the central unit. In step 166, the central unit generates performance analysis information based on the records of all of the wireless devices for one or more of: the overall network, one or more network concentrators and/or one or more wireless devices. For each of the performance analyses, the central unit may also determine the performance of the network, network concentrator or wireless device at a particular time since each record includes the starting time of the segment of the communications sessions associated with that record.

FIG. 4B illustrates more details of the method 160 for application specific, network performance measurement of the network that supports a real-time application. A first segment of a communication session between a wireless device (badge in the exemplary embodiment) and a network concentrator (an access point in the exemplary embodiment) begins (168a). When the wireless device does not roam between access points during the communication session, the communications session has a single segment and the communication session is completed (168g) and the radio statistics (radio stats) for the segment of the communication session are collected as a set at the wireless device (168h). If the user of the wireless device roams from a network concentrator to one or more other network concentrator during the communications session (168b), the communications session has one or more segment corresponding to the number of network concentrators that the wireless device communicates with during the communication session. During the roaming, the radio stats are collected and buffered by the wireless device (168c) for each network concentrator to which the wireless device roams during the communication session (and therefore for each communication session segment) (168d). The wireless device continues to buffer and collect up to 10 set of radio stats (for 10 different network concentrators to wireless device communication session segments) (168e) until the communication session is completed (168f). When the wireless device roams, a set of radio stats 170a-c (shown in FIG. 7) for each communication session segment of the communications session is collected. In the example in FIG. 7, the user started the communications session at access point A, roamed to access point B during the communications session, and roamed back to access point A and ended the communications session at access point A. Thus, the communication session in this example includes three segments including one segment for the communications between the wireless device and access point A, one segment for the communication session between the wireless device and access point B and one segment for the communications between the wireless device and access point A and radio stats are collected and buffered for each segment. In this manner, the radio statistics for each segment during each communications session with each wireless device are captured at each wireless device. Obviously, if different radio statistics are used to measure the performance, a slightly different record for the log file may be generated by each wireless device as would be understood by one of ordinary skill in the art.

Returning to FIG. 4B, when the communication session between the wireless device and the one or more network concentrators is completed (either when the wireless device does not roam or roams between multiple network concentrators), the wireless device sends the radio stat sets to the central unit/central computer (168i) and the central computer records each set of radio stats from the wireless device in a log (168j) and the central computer then generates application specific, network performance analysis information of the network at each wireless device, at each network concentrator and/or in the overall system based on the log (168k).

For example, for the packet error rate radio statistics, the system may generate performance information for each element of the network. For example, the central unit may generate one of more of the following measurements: 1) a packet error rate of each wireless device to rank the wireless devices according to their packet error rate (to access the radio performance of each wireless device); 2) a packet error rate for each wireless device during a communications session; 3) a packet error rate for each wireless device during multiple communications sessions; 4) the packet error rate for each wireless device over multiple communication sessions which can then be compared to a baseline packet error rate for wireless devices or to the packet error rate of other wireless devices; 5) a packet error rate of a particular network concentrator (based on all of the records for the communications sessions that used the particular network concentrator) to rank the network concentrators based on their packet error rate (to access the network concentrator performance such as the coverage of each network concentrator) or compare each network concentrator to a baseline packet error rate for the network concentrators; 6) a packet error rate for each network concentrator during a communications session; 7) a packet error rate for each network concentrator during multiple communications sessions; 8) a packet error rate of particular overall network during a communications session; 9) a packet error rate of particular overall network during multiple communication sessions; and 10) a packet error rate of particular overall network during multiple communication sessions to rank the particular overall network against other networks or against a baseline packet error rate for the overall network.

With these statistics, an administrator is able to identify various problems with the network system. In particular, the administrator can compare the packet error rate for the particular overall network that support a particular application to an average packet error rate for other overall networks that support the same particular application to determine if a particular overall network has a higher than expected packet error rate. The administrator can also determine, for a particular network: 1) whether a particular network concentrator is underperforming according to a known baseline or statistical norm for network concentrators; and/or 2) whether a particular wireless device is underperforming according to a known baseline or statistical norm for wireless devices. These statistics also permit an administrator to characterize the performance of the application (based on the performance of the network elements) or other applications with similar network elements.

Figures 7, 8:
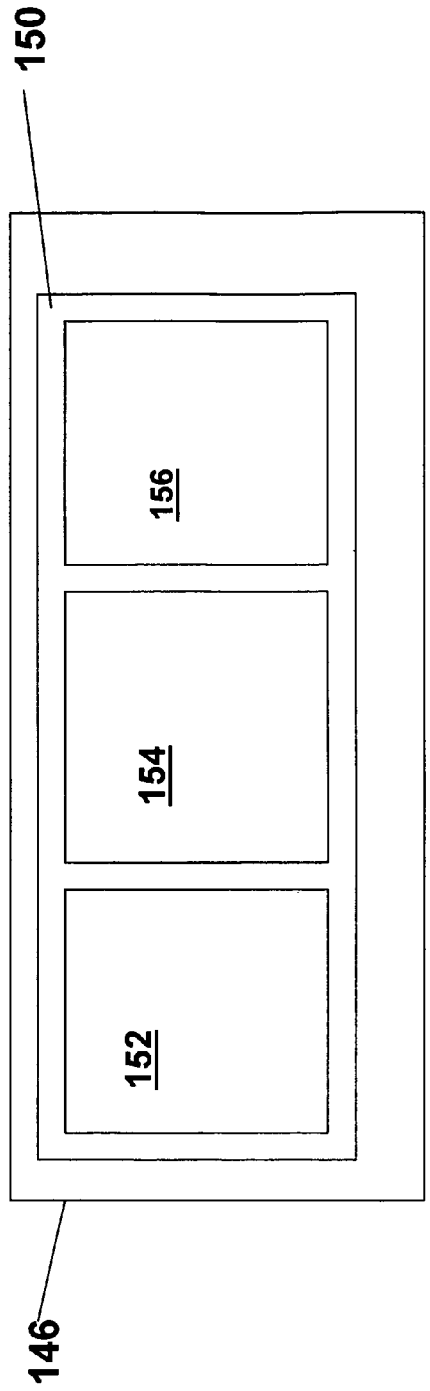
FIG. 7 illustrates an example of a series of records captured by a mobile device that is roaming through the network.
FIG. 8 illustrates an example of an implementation of the application specific, network performance measuring system in the central computing device shown in FIG. 3B.

FIG. 8 illustrates an example of an implementation of a system for monitoring network performance in the central computing device shown in FIG. 3B. In particular, the administrator module 146 may further include a network performance module 150 (preferably implemented in software on the central unit) wherein the module 150 further comprises a module 152 for receiving and storing the log files from the wireless devices that are part of the wireless network, a module 154 for performing the network, access point and wireless device performance analysis described above and a module 156 for reporting out the results of the performance analysis. In a preferred embodiment, each module of the network performance module 150 is preferably a piece of software code that performs the functions and operations described above.

The application specific, network performance measuring system and method was illustrated for a particular application running on a particular wireless network system wherein the application is a voice-controlled communication application and the wireless network is an 802.11 (b) or (g) network with access points and the badges. However, the application specific, network performance measuring may also be used for networks that support other applications that may be both real-time applications and non real-time applications. For example, the application specific, network performance measuring system may be used with other network systems that communicate voice over any wireless network or a system for real-time video conferencing. As another example, the application specific, network performance measuring system may be used with sensor application that gathers information from one or more sensors in a network which is not a real-time application. In addition, the application specific, network performance measuring system may be used with both wireless networks, wired networks and networks that are a combination of wireless and wired components.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for measuring application specific, network performance of a network that supports an application, the network having a central computing device unit, one or more network concentrators coupled to the central computing device unit over a link wherein each network concentrator communicates with the central computing device unit, each network concentrator having a coverage range and a plurality of wireless devices that wirelessly communicate with a network concentrator when the wireless device is in the coverage range of the network concentrator, the system comprising:

a unit, within each wireless device, that gathers a received data characteristic for one or more segments of a communications session between the wireless device and one or more network concentrators to generate a set of received data characteristics for each segment of each communications session and a unit that communicates the set of received data characteristic for the one or more segments of the communications session to a central computing device unit; and a performance unit, within the central computing device unit, that generates a performance indication of the network that supports the application based on the set of received data characteristic for the one or more segments of the communications session for the wireless device.

2. The system of claim 1, wherein the set of received data characteristics further comprises a set of radio statistics for the wireless device.

3. The system of claim 1, wherein the application further comprises a voice controlled communication application, each network concentrators further comprises an access point and the wireless device further comprises a badge.

4. The system of claim 1, wherein the set of received data characteristics for the one or more segments of each communication session further comprises a received data characteristic for a segment between the wireless device and a first network concentrator and a received data characteristic for a segment between the wireless device and a second network concentrator when the wireless device roams between the first and second network concentrators.

5. The system of claim 1, wherein the performance unit further comprises a unit that generates a performance indication of the network that supports the application, a unit that generates a performance indication of the network at a particular network concentrator and a unit that generates a performance indication of the network at a particular wireless device.

6. The system of claim 1, wherein the received data characteristic for each segment of the communications session further comprises a packet error rate for data packets received by the wireless device during the segment of the communications session, a received signal strength at the wireless device during the segment of the communications session, a jitter/latency measure at the wireless device during the segment of the communications session or a data rate at the wireless device during the segment of the communications session.

7. The system of claim 1, wherein the set of received data characteristics for each segment of the communications session further comprises a number of expected data frames during the segment of the communications session, a number of received data frames during the segment of the communication session, a network concentrator identifier communicated with during the segment of the communication session and start time for the segment of the communication session.

8. The system of claim 7, wherein the performance unit further comprises a unit that generates a performance indication of the network at a particular network concentrator wherein the performance indication for the particular network concentrator is generated using the set of received data characteristics that contain the network concentrator identifier of the particular network concentrator.

9. The system of claim 1, wherein the gathering unit and the communication unit each further comprise a piece of software code executed by a processing unit of the wireless device.

10. The system of claim 1, wherein the wireless device further comprises a processing unit and wherein the gathering unit and the communication unit each further comprise a piece of microcode embedded into the processing unit of the wireless device.

11. The system of claim 1, wherein the link further comprises a wireless local area network and wherein each wireless device further comprises a badge having a microphone and a speaker for implementing a voice-based communication session with the central computing device unit using the wireless local area network.

12. The system of claim 11, wherein the central computing device unit further comprises a voice command interpreter that interacts with each badge to perform the voice-based communication session.

13. A method for measuring the network performance of a network that supports an application, the network having a central computing device unit, one or more network concentrators coupled to the central computing device unit over a link and a plurality of wireless devices that wirelessly communicate with a network concentrator, the method comprising:
gathering, at each wireless device during one or more segments of a particular communication session, a received data characteristic for each segment of the communications session between the wireless device and a particular network concentrator to generate a set of received data characteristic for the one or more segments of each communications session;
communicating, from each wireless device to a central computing device unit, the set of received data characteristic for each segment of the communications session; and
generating a performance indication of the network that supports the application based on the set of received data characteristic for each segment of the communications session.

14. The method of claim 13, wherein gathering the received data characteristic for each segment of the communication session further comprises gathering received data characteristic for a segment between the wireless device and a first network concentrator and gathering received data characteristic for a segment between the wireless device and a second network concentrator when the wireless device roams between the first and second network concentrators.

15. The method of claim 13, wherein the set of received data characteristics further comprises a set of radio statistics for the wireless device.

16. The method of claim 13, wherein the application further comprises a voice controlled communication application.

17. The method of claim 13, wherein generating the performance indication further comprises generating a performance indication of the overall network that supports the application, generating a performance indication of a particular network concentrator of the network and generating a performance indication of a particular wireless device of the network.

18. The method of claim 13, wherein the received data characteristic for each segment of the communications session further comprises a packet error rate for data packets received by the wireless device during the segment of the communications session, a received signal strength at the wireless device during the segment of the communications session, a jitter/latency measure at the wireless device during the segment of the communications session or a data rate at the wireless device during the segment of the communications session.

19. The method of claim 13, wherein the set of received data characteristic for each segment of the communications session further comprises a number of expected data frames during the segment of the communications session, a number of received data frames during the segment of the communication session, a network concentrator identifier communicated with during the segment of the communication session and start time for the segment of the communication session.

20. The method of claim 19, wherein generating the performance indication of the network supporting the application at a particular network concentrator further comprises generating the performance indication of a particular network concentrator using the set of received data characteristic that contain the network concentrator identifier of the particular network concentrator.

21. A central computing device for a network coupled to one or more network concentrators over a link that are in turn wirelessly coupled to one or more wireless devices, the central computing device comprising:
a processing unit;
a memory; and
a performance module stored in the memory and executed by the processing unit to measure the performance of the network supporting an application and generate performance statistics for the network performance based on a set of communications session segment characteristics gathered at each wireless device, the performance module further comprising one or more of an application performance module that generates a set of statistics about a performance level of the overall network supporting the application based on the set of communications session segment characteristics gathered at each wireless device wherein the sets of communications session segment characteristics contain a received data characteristic for the segment of the communications session, a network concentrator performance module that generates a set of statistics about a performance level of each network concentrator that is part of the network supporting the application based on the set of communications session segment characteristics gathered at each wireless device and a wireless device module that generates a set of statistics about a performance level of each wireless device of the network that supports the application based on the sets of communications session segment characteristics gathered at each wireless device.

22. The central computing device of claim 21, wherein the received data characteristic for each communications session segment further comprises a packet error rate for data packets received by the wireless device during the segment of the communications session, a received signal strength at the wireless device during the segment of the communications session, a jitter/latency measure at the wireless device during the segment of the communications session or a data rate at the wireless device during the segment of the communications session.

23. The central computing device of claim 21, wherein the set of communication session segment characteristics further comprises a number of expected data frames during the segment of the communications session, a number of received data frames during the segment of the communication session, a network concentrator identifier communicated with during the segment of the communication session and start time for the segment of the communication session.

24. The central computing device of claim 23, wherein the performance module further comprises a unit that generates a performance indication of a particular network concentrator that is part of the network that supports the application wherein the performance indication for the particular network concentrator is generated using the received data characteristic that contain the network concentrator identifier of the particular network concentrator.

25. The central computing device of claim 21, wherein the link further comprises a wireless local area network and wherein each wireless device further comprises a badge having a microphone and a speaker for performing a voice-based communication session with the central computing device unit using the wireless local area network.

26. The central computing device of claim 25, wherein the central computing device unit further comprises a voice command interpreter that interacts with each badge to perform the voice-based communication session.

27. A method for measuring the network performance of a network that supports an application, the network having a central computing device unit, one or more network concentrators coupled to the central computing device unit over a link and a plurality of wireless devices that wirelessly communicate with a network concentrator, the method comprising:
receiving, from each wireless device, a set of received data characteristics for each segment of a communications session wherein the segment of a communications session is a communication between the wireless device and a particular network concentrator; and
generating a performance indication for the network that supports the application based on the set of received data characteristic for each segment of the communications session.

28. The method of claim 27, wherein receiving the set of received data characteristics for each segment of the communication session further comprises gathering a set of data characteristics for a segment between the wireless device and a first network concentrator and gathering a set of data characteristics for a segment between the wireless device and a second network concentrator when the wireless device roams between the first and second network concentrators.

29. The method of claim 27, wherein the set of received data characteristics further comprises a set of radio statistics for the wireless device.

30. The method of claim 27, wherein the application further comprises a voice controlled communication application.

31. The method of claim 27, wherein generating the performance indication further comprises generating a performance indication of the network that supports the application, generating a performance indication of particular network concentrators that are part of the network that supports the application and generating a performance indication of particular wireless devices that are part of the network that supports the application.

32. The method of claim 27, wherein the set of received data characteristic for each segment of the communications session further comprises a packet error rate for data packets received by the wireless device during the segment of the communications session, a received signal strength at the wireless device during the segment of the communications session, a jitter/latency measure at the wireless device during the segment of the communications session or a data rate at the wireless device during the segment of the communications session.

33. The method of claim 27, wherein the set of received data characteristic for each segment of the communications session further comprises a number of expected data frames during the segment of the communications session, a number of received data frames during the segment of the communication session, a network concentrator identifier communicated with during the segment of the communication session and start time for the segment of the communication session.

34. The method of claim 33, wherein the performance unit further comprises a unit that generates a performance indication of a particular network concentrator that is part of the network that supports the application wherein the performance indication for the particular network concentrator is generated using the received data characteristic logs that contain the network concentrator identifier of the particular network concentrator.

35. The method of claim 27 further comprising gathering, at each wireless device, the set of received data characteristics for each segment of the communications session and communicating the set of received data characteristics for each segment of the communications session to the central computing device unit.

36. The method of claim 27, wherein the link further comprises a wireless local area network and wherein each wireless device further comprises a badge having a microphone and a speaker for performing a voice-based communication session with the central computing device unit using the wireless local area network.

37. The method of claim 36, wherein the central computing device unit further comprises a voice command interpreter that interacts with each badge to perform the voice-based communication session.

* * * * *